Jan. 31, 1967 H. E. VOIGT 3,302,187

COMPUTER STORAGE READ-OUT SYSTEM

Filed Dec. 16, 1964

Inventor:
Heinz E. Voigt
By: Spencer & Kaye
Attorneys

United States Patent Office 3,302,187
Patented Jan. 31, 1967

3,302,187
COMPUTER STORAGE READ-OUT SYSTEM
Heinz E. Voigt, Konstanz, Germany, assignor to Telefunken Patentverwertungsgesellschaft m.b.H., Ulm (Danube), Germany
Filed Dec. 16, 1964, Ser. No. 418,744
Claims priority, application Germany, Dec. 20, 1963, T 25,298
5 Claims. (Cl. 340—172.5)

The present invention relates generally to a large computer storage unit, and, more particularly, to one which comprises magnetic storage cells, and which is composed of a plurality of storage components, each with its own control device.

It is known that as a result of pulse transit times and stray capacitances, limits are imposed on the size of a one-part storage block. Accordingly, it is usual to subdivide a storage unit having a large storage capacity into storage components and to provide each component with its own control device. That is, each is provided with a storage address register, a storage register as a buffer for the information to be written or read, and with the necessary electronic circuit elements which decode the storage addresses and control the store cycle.

With this structure, which is necessary for technological reasons, it is also possible to operate the individual storage components simultaneously to a large extent by interlacing the store cycles in time. By this means, the time for the extraction of information from $n$ storage components can be reduced considerably below $n$-times the duration of a store cycle. This feature can be utilized without excessive expenditure, particularly when writing information in the storage components, because in this case it is not necessary to wait for the completion of the store cycle, which is essential for time economy. After the transfer to a storage component of the address and of the information to be written, the control of the entire storage can again act on other storage components.

On the other hand, when information is read out of a storage component, a complete store cycle has to be awaited after the address transfer before the information is available. Thus, the control for the entire storage must either wait idly or it must be so universal in its design that it can select in the meantime other storage components without losing the correlation between the original control of a storage component and the information available in the storage register after the conclusion of the store cycle. For example, this correlation may be assured by a multiple arrangement of the information channels leading from the large storage unit or mass memory to the computer.

With this prior art in mind, it is a main object of the present invention to avoid such heavy expense without adversely affecting the optimum simultaneous operation.

Another object is to provide a device of the character described wherein a plurality of arithmetic units can be connected to the large storage unit in a relatively simple manner.

These objects and others ancillary thereto are accomplished in accordance with preferred embodiments of the present invention wherein storage read demands are dealt with in two steps, which are initiated by first and second control signals which are independent of one another. In the first step, the control device for the required storage component is selected and provided with the address of the required storage location whereby a storage read cycle is stimulated, while during the second step the content of the storage location is issued as soon as the store cycle is completed.

The principle underlying the invention is therefore to be seen in that the close dependence between the reading operation and the store cycle is a disadvantage, and that the expenditure for governing the second signal, which may arrive at any time, is substantially less than that for multiple arrangement of information channels. An additional marker device, which is then necessary, only has to ascertain from which arithmetic unit a first or a second control signal has come and then briefly marks the transmission path between the storage and this arithmetic unit.

Additional objects and advantages of the present invention will become apparent upon consideration of the following description when taken in conjunction with the accompanying drawings in which.

Figure 1:
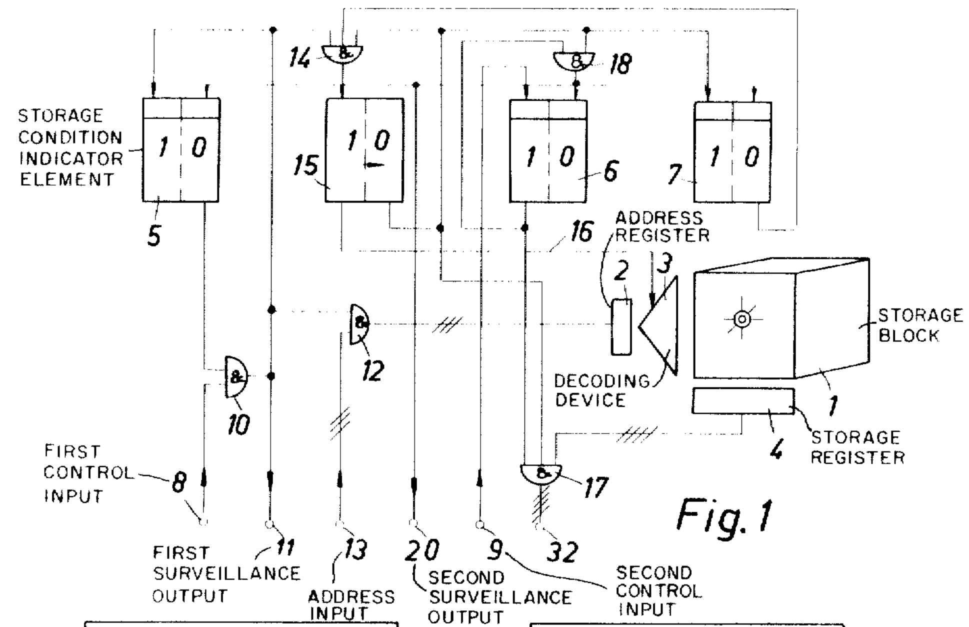
FIGURE 1 is a block diagram of a storage component including the associated control device.

With more particular reference to the drawings, FIGURE 1 shows that each storage component contains as an essential element a storage block 1 which may comprise, for example a plurality of storage matrices containing magnetic storage cores. The storage cores are generally combined to form groups, each of which is capable of storing one information word and each of which forms one storage location which can only be selected as a whose and can be determined by an address.

Furthermore, an address register 2 is provided which is usually composed of binary register elements and is capable of receiving an address which is decoded in a decording device 3 and clearly defines one storage location. One storage register 4 serves as a buffer between the storage block and the equipment connected to the storage block. It is capable of storing precisely one information word.

Since, as already explained, the problem on which the invention is based only arises in connection with reading information out of storage, the following explanations will be simplified by omitting the flow of information in the direction for writing in the storage block. This does not mean, however, that the system according to the invention for reading from the storage block can not be combined with a system for writing.

Associated with each storage component, such as is illustrated in FIGURE 1, are three bistable register elements 5 to 7 which ensure the operation according according to the invention. The first of these register elements 5 indicates the storage condition of the storage component. It is set by a first control signal which is supplied to the storage component through a first control input 8 and it is only reset when the storage is freed for fresh control signals by means of the second control signal which is supplied to a second control input 9. The input 8 acts on an AND-gate 10 which is only opened if the storage component is empty during the appearance of a first control signal. The register element 5 is then set by the output of this AND-gate and at the same time this fact is reported back, through the first surveillance output 11, to the arithmetic unit which has issued the first control signal. In this manner, double storing is avoided.

The output signal from the AND-gate 10 initiates the operation of the first step, in that it occupies the storage component, transfers the address in parallel mode through a multiple AND-gate 12 from an address input 13 to the address register 2 and, through a further AND-gate 14, changes the state of a monostable flip-flop 15 which synchronizes the store cycle (through line 16). The AND-gate 10 need only be activated for a very brief moment so that only a short signal is required at the input 8. The arithmetic unit, which has issued the control signal to the input 8, can therefore immediately assume other switching conditions so that, for example, at the next moment, a first control signal and an associated address may be supplied to another storage component. Thus, according to the invention, the connection between the arithmetic unit and the storage component does not remain in existence during the entire store cycle, but is interrupted again immediately after the first control signal has been issued and, according to the invention, is only re-established as a result of renewed activity by the arithmetic unit in sending out a second control signal via input 9.

It will now be assumed that the second control signal only arrives after the termination of the automatically proceeding store cycle supervised only by the monostable flip-flop 15. The second control signal is supplied to the bistable register element 6 directly from the input 9 in such a manner that this element is set and so opens a multiple AND-gate 17, through the output 32 of which the information made available in the storage register 4 is transferred in parallel mode to the arithmetic unit. At the same time, this element 6 activates a further AND-gate 18, the output pulse from which resets the register elements 5 to 7, so that the storage component is again ready to receive a fresh first control signal.

The third register element 7 is set by the monostable flip-flop 15 when the latter changes its state, and it prevents the monostable flip-flop from being controlled twice within one store cycle by blocking the AND-gate 14 after the first changeover until the end of the occupied condition.

Since the second control signal may follow the first control signal at any time, it may occur that the second control signal arrives during the store cycle, that is to say before the information is available in the storage register 4. In this case, too, the register element 6 is set, but it only stores the output offer of the arithmetic unit, without any further direct action, until the store cycle is terminated. Only when this is the case is the AND-gate 17 released through a line 19 coming from the monostable flip-flop 15, and the information is transferred. At the same time, the register elements are reset.

Through a further or second surveillance output 20, the storage component informs the arithmetic unit that issues the second control signal whether and when the second step takes place, that is to say, the transfer of information to the arithmetic unit. This output 20 is connected directly to the output of the AND-gate 18, through which the storage component is freed.

Figure 2:
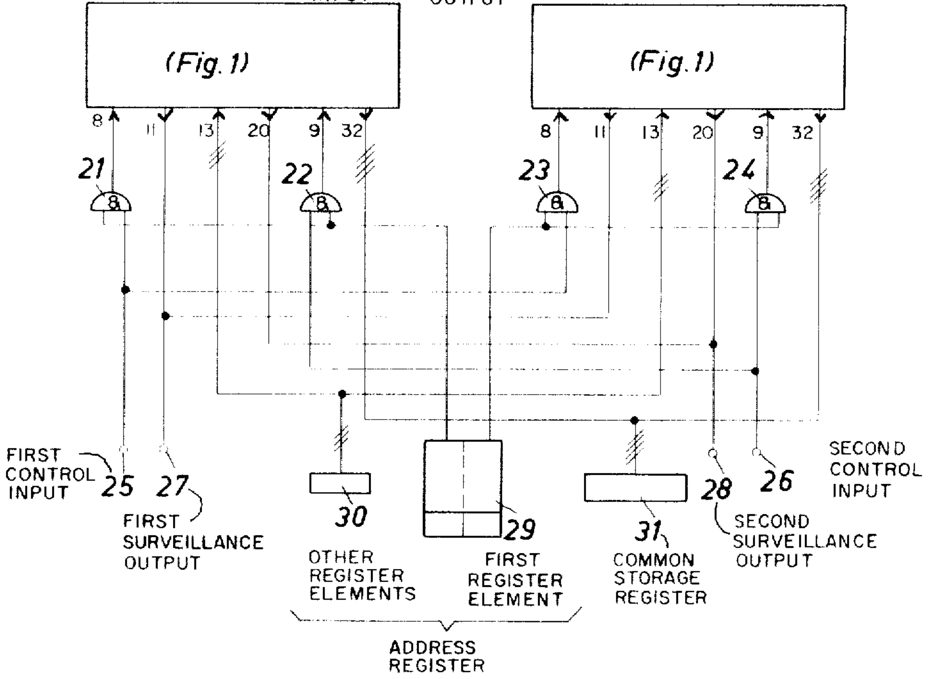
FIGURE 2 is a block diagram illustrating the interconnection of two storage components to form a large storage unit.

The storage component described with reference to FIGURE 1 permits a combination with any desired number of storage components which together form a large storage unit. FIGURE 2 shows the interconnection of two storage components. In practice, the number of interconnected storage components would be considerably greater. The interconnection of the storage components is effected in such a manner that the information and address lines as well as the report-back lines (outputs 11, 20 and 32) are each connected together. The inputs 8 and 9 of the individual storage components, through which the control signals are supplied, are combined through AND-gates 21 to 24 in a manner such that the inputs 8 and 9 of each storage components are connected to the sources of the first and second control signals in the arthmetic unit. The source of the first control signals is connected to an input 25 which leads to the AND-gates 21 and 23, while the source of the second control signals is connected through an input 26 to the AND-gates 22 and 24. The reporting back, or surveillance, regarding the delayed condition is effected through an output 27, which combines all the outputs 11 of the storage component shown in FIGURE 1, while an output 28 combines all the outputs 20 shown in FIGURE 1.

With only two storage components, the address register of the large storage unit has only one bistable element to distinguish between the storage components, while all further address elements determine a location within the storage component. The one element 29 is shown separate from the rest of the address which is present in the address register 30. This element 29 preferably stores the least significant place in the address so that address sequences resulting from counting relate regularly alternately to the two storage components. By this means, simultaneous operation is best assured with directly following addresses which frequently occur.

The operation of the large storage unit according to the invention is rendered possible with the interconnection described. The first step is initiated by the setting of an address in the address registers 29 and 30 and by a first control signal through the input 25. This control signal only reaches that storage component which is determined by the contents of the element 29. Whether storage has been effected or not is immediately reported back through the control output 27. Then the address registers 29 and 30 can immediately be changed over in order to transmit a further first or a second control signal to one of the other storage components.

If the arithmetic unit requires the requested data as quickly as possible, then immediately after the first control signal it issues the second control signal over the line 26 before the address element 29 has changed its state. It is advisable, however, to issue the first control signal as early as possible because there is then no waiting time until the end of the store cycle when the second control signal eventually arrives. Together with the second control signal, the address element 29 must again be briefly set so that the second control signal may reach the required storage component. Finally, with the reporting back through the common output 28, the information requested is available in the common storage register 31 of the large storage unit.

The described example does not represent the only embodiment of the invention, particularly with regard to the details of the control device. The number of storage components which can be interconnected can also be increased as desired. The multiple lines necessary for the parallel transfer of the addresses and information can also be simplified if addresses and information are transferred in serial mode.

It will be understood that the above description of the present invention is susceptible to various modifications, changes and adaptations, and the same are intended to be comprehended within the meaning and range of equivalents of the appended claims.

What is claimed is:

1. A computer read out system, comprising, in combination:

a plurality of storage blocks;

a two part address register with the first part arranged to contain the lowest value portion of the address for determining the storage block selection; and the second part arranged to contain the higher value portion of the address for determining the location within a storage block;

first control signal input means;

second control signal input means;

a plurality of gate circuits connected with the first part of said register for selectively opening, depending upon the content of said first part, the path for a first control signal and for a second control signal to the selected storage block;

a common storage register for receiving the information read out of the selected storage block;

a partial address register for each storage block and connected for receiving the higher value portion of the address from said second part when the first control signal is applied to said first control signal input means;

a buffer register for connection with said common storage register;

means connected to be controlled by said first control signal for reading out the content of the selected storage location and placing it into said buffer register for intermediate read out of the selected storage block; and means connected to be controlled by said second control signal for transmitting the content of the buffer register into the common storage register upon termination of read out into the buffer register.

2. A system as defined in claim 1 comprising a register element for each storage block and which register element is connected to store the second control input means for delaying the action of the second control signal if this signal arrives before the termination of the store cycle stimulated by a preceding first step.

3. A system as defined in claim 2 comprising a further register element associated with each storage block which further register element is connected to be set by the first control signal and remains in the set state until the termination of the second step and prevents the storage block from being influenced by further first control signals during this period.

4. A system for reading the information contents of a large computer storage unit, comprising, in combination:

a large storage unit including a plurality of storage components capable of having information contents at addressable store locations, each storage component including (a) storage block means; and (b) control means associated therewith, said control means having (1) a first control input means for providing a first control signal, (2) second control input means independent of said first control input means for providing a second control signal, and (3) circuit means connecting said first and second control input means with said storage block means for initiating (i) a store read cycle as a result of the appearance of the first control signal and as the first step, and (ii) issuance of the contents of the desired store location as a result of the appearance of the second control signal and as the second step when the store cycle is completed.

5. A two-step storage read out system for use with a storage register and an address register, said system comprising, in combination a plurality of storage components each including:

(1) storage block means;

(2) a first bistable element initiating a first step in the read out cycle and for indicating the condition of the storage component and having a ZERO and a ONE input and an output activated when in its ZERO condition;

(3) first and second control input means;

(4) first and second surveillance output means;

(5) first AND-gate means having two inputs and an output, one of said inputs being connected to the output of said first bistable element, the other input being connected to said first control input means, and the output being connected to said first surveillance output means and to the ONE input of said first bistable element;

(6) collective address input means;

(7) second collective AND-gate means having two inputs and an output, one input being connected to the output of said first AND-gate means, the other input being connected to said address input means, and the output being connectible to an address register;

(8) a store cycle surveillance monostable flip-flop having an input and two outputs which are a ONE output and a ZERO output, said ONE output being connected to a line which synchronizes the store cycle;

(9) a second bistable element for initiating a second step in the read out cycle and having two inputs and an output activated when in its ONE condition, said second control input means being connected to the ONE input;

(10) third AND-gate means having two inputs and an output connected to the ZERO input of the second bistable element, the ZERO input of the first bistable element and the second surveillance output means, one of said inputs being connected to the ZERO output of said monostable flip-flop, and the other of said inputs being connected to the output of said second bistable element;

(11) a third bistable element for preventing the monostable flip-flop from being controlled twice during one store cycle and having a ONE input connected with the ZERO output of said flip-flop, a ZERO input connected with the output of said third AND-gate, and an output activated when it is in its ZERO condition;

(12) fourth AND-gate means having a first input connected to the output of said first AND-gate means, a second input connected to the output of said third bistable element, a third input connected to the ZERO output of said flip-flop, and an output connected to the input of said flip-flop; and

(13) fifth collective AND-gate means having a first input connected to the output of said second bistable element, a second input connected to the ZERO output of said flip-flop, a third input connectible to a storage register, and an output.

References Cited by the Examiner

"Computer Logic," October 1960, Flores, pp. 252–257, Prentice-Hall.

"Digital Computer Design Fundamentals," October 1962, Chu, p. 406 and p. 420, McGraw-Hill.

ROBERT C. BAILEY, *Primary Examiner.*

M. LISS, *Assistant Examiner.*